US012727062B2

(12) United States Patent
Carson

(10) Patent No.: US 12,727,062 B2
(45) Date of Patent: Sep. 1, 2026

(54) APPARATUS AND METHOD FOR MICROWAVE HEATING OF FLUIDS

(71) Applicant: 1863815 Ontario Limited, Point Edward (CA)

(72) Inventor: Glenn L. Carson, Point Edward (CA)

(73) Assignee: 1863815 Ontario Limited, Point Edward (CA)

( * ) Notice: Subject to any disclaimer, the term of this patent is extended or adjusted under 35 U.S.C. 154(b) by 933 days.

(21) Appl. No.: 17/309,040

(22) PCT Filed: Oct. 16, 2019

(86) PCT No.: PCT/CA2019/051467

§ 371 (c)(1),
(2) Date: Apr. 16, 2021

(87) PCT Pub. No.: WO2020/077453

PCT Pub. Date: Apr. 23, 2020

(65) Prior Publication Data

US 2021/0352782 A1 Nov. 11, 2021

Related U.S. Application Data

(60) Provisional application No. 62/746,222, filed on Oct. 16, 2018, provisional application No. 62/843,732, filed on May 6, 2019.

(51) Int. Cl.
*H05B 6/80* (2006.01)
*F22B 1/28* (2006.01)
(Continued)

(52) U.S. Cl.
CPC ............. *H05B 6/802* (2013.01); *F22B 1/282* (2013.01); *F24H 1/101* (2013.01); *F24H 1/107* (2013.01);
(Continued)

(58) Field of Classification Search
CPC . C10G 9/36; F22B 1/281; F22B 1/282; F24H 1/101; F24H 1/107; F24H 2250/12;
(Continued)

(56) References Cited

U.S. PATENT DOCUMENTS 2,120,125 A * 6/1938 Cassidy .................. F28F 1/124 165/DIG. 437
3,930,536 A * 1/1976 Cherry .................... F28D 7/106 29/890.036
(Continued)

FOREIGN PATENT DOCUMENTS

CA 1261735 A 9/1989
CA 1272251 A1 7/1990
(Continued)

OTHER PUBLICATIONS

Machine translation of DE-3224114: Fritz, Process for heating liquids having constituents with a tendency to form deposits, 1983 (Year: 1983).*
(Continued)

*Primary Examiner* — Woody A Lee, Jr.
*Assistant Examiner* — Abigail H Rhue
(74) *Attorney, Agent, or Firm* — CPST Intellectual Property Inc.; Santosh K. Chari

(57) ABSTRACT

A microwave heating apparatus is provided herein comprising a tubing conduit consisting of two or more removable bend portions connected to each other. The tubing conduit is supported by a support system. Each removable bend portion includes a microwave emitter to heat a fluid flowing through the conduit. The apparatus can replace or be integrated into existing heating equipment used in, for example, steam cracking of hydrocarbons. Also provided are pipe segments, such as spools, that are adapted for heating a fluid by applying microwave energy. The pipe segments can be
(Continued)

lined with microwave absorbing materials and comprise an opening through which an insert comprising a microwave emitter can be removably inserted and retained.

11 Claims, 12 Drawing Sheets

(51) Int. Cl.

| | |
|---|---|
| ***F24H 1/10*** | (2022.01) |
| ***F24H 9/1818*** | (2022.01) |
| ***H05B 6/64*** | (2006.01) |
| *C10G 9/36* | (2006.01) |

(52) U.S. Cl.
CPC ......... *F24H 9/1818* (2013.01); *H05B 6/6402* (2013.01); *C10G 9/36* (2013.01); *F24H 2250/12* (2013.01)

(58) Field of Classification Search
CPC . F24H 9/1818; H05B 2214/03; H05B 6/6402; H05B 6/802; H05B 6/806; F02M 21/00; F01M 2011/0025
See application file for complete search history.

(56) References Cited

U.S. PATENT DOCUMENTS

| | | | | |
|---|---|---|---|---|
| 4,353,890 A * | 10/1982 | Scott | A61Q 11/00 | |
| | | | 426/534 | |
| 2008/0302702 A1 | 12/2008 | Devakottai | | |
| 2013/0028580 A1* | 1/2013 | Bigex | F16L 53/35 | |
| | | | 29/890.03 | |
| 2014/0014316 A1* | 1/2014 | Blue | E21B 43/2408 | |
| | | | 166/61 | |
| 2017/0137722 A1* | 5/2017 | Petela | B01J 19/2415 | |
| 2018/0265792 A1* | 9/2018 | Choi | C10G 53/02 | |
| 2021/0179948 A1* | 6/2021 | Kochendoerfer | H05B 3/42 | |

FOREIGN PATENT DOCUMENTS

| | | | |
|---|---|---|---|
| CA | 2200353 A1 | | 5/1996 |
| CA | 2483981 A1 | | 11/2003 |
| CA | 2819657 A1 | | 1/2014 |
| CN | 1268480 A | | 10/2000 |
| CN | 106925196 A1 | | 7/2017 |
| DE | 3224114 A1 | * | 12/1983 |
| KR | 20100130267 A | | 12/2010 |
| WO | 2019100171 A1 | | 5/2019 |

OTHER PUBLICATIONS

Extended European Search Report issued in corresponding EP Application No. 19873241; search completed Jun. 20, 2022.
International Search Report; issued in parent PCT Application No. PCT/CA2019/051467; search completed Dec. 1, 2019.
International Search Report; issued in related PCT Application No. PCT/CA2018/051507; search completed Jan. 22, 2019.

* cited by examiner

FIG. 1 “Prior Art”

APPARATUS AND METHOD FOR MICROWAVE HEATING OF FLUIDS

CROSS-REFERENCE TO RELATED APPLICATIONS

This application is a National Entry of PCT Application No. PCT/CA2019/051467, filed on Oct. 16, 2019, which claims priority to U.S. Provisional Patent Application No. 62/746,222, filed on Oct. 16, 2018, and U.S. Provisional Patent Application No. 62/843,732, filed on May 6, 2019. The entire contents of the aforementioned applications are incorporated herein by reference as if set forth in their entirety.

TECHNICAL FIELD

The present description generally relates to apparatuses and methods for heating a fluid flowing through tubing. More particularly, the description relates to apparatuses and methods incorporating one or more microwave heating devices.

BACKGROUND

Currently, there are limited industrial applications of microwave heating technology since this technology can be considered expensive in terms of capital cost and energy conversion. However, there has been a recent surge in studies elucidating the fundamentals of microwave-matter interactions, and the number of chemical processes that could feasibly benefit from microwave technology is growing.

Processes such as hydrocarbon cracking, $NO_x$ reduction and $SO_x$ reduction have been successfully carried out in laboratory scale microwave reactors. A laboratory scale reactor that has been used for ethane cracking comprises a straight quartz tube, through which ethane flows, surrounded by microwave emitters. Quartz is "transparent" to microwave radiation; thus, microwaves can pass through the quartz to heat the ethane within the tube.

Hydrocarbon cracking plants, particularly steam cracking plants, are some of the most energy intensive plants in the chemical industry. A typical steam cracking furnace comprises a number of tubing coils through which a hydrocarbon and steam mixture flows. A number of burners surround the tubing coils in what is known as the radiant section and heat the tubing primarily by radiant heat transfer. The fuel for these burners can be expensive and its combustion products can be harmful to the environment. It is believed that implementing microwave technology in processes that can be considered harmful to the environment, such as steam cracking, can reduce the carbon footprint and/or operating costs associated with such processes.

Applicant's co-pending PCT application no. PCT/CA2018/051507, entitled "Removable Bend in Tubing for Industrial Process Equipment" (the entire content of which is incorporated herein by reference), discloses an apparatus developed, at least in part, to address one or more of the above drawbacks.

However, most industrial scale chemical processes employ equipment made primarily from carbon steel. It is known that exposing certain metals, such as carbon steel, to microwave radiation can cause electrical sparks which can, in turn, have destructive effects such as burning holes in metal surfaces. Such sparks can also damage microwave emitters and/or generate a surge that can damage sensitive microelectronics.

There is a need for an improved method and apparatus for microwave heating of fluid in tubes.

SUMMARY OF THE DESCRIPTION

In one aspect, there is provided an apparatus for heating a fluid, the apparatus comprising: a first and second bend portion each having first and second ends; the first end of the first bend portion being removably attached to an upstream tube; the second end of the first bend portion being removably attached to the first end of the second bend portion such that the first and second bend portions are in fluid communication; the second end of the second bend portion being removably attached to a downstream tube; each bend portion including at least one microwave emitter; and a support structure containing the first and second bend portions.

In another aspect, there is provided an apparatus for heating a fluid, the apparatus comprising: a tube; a first end and a second end, the tube being interposed therebetween; an opening intermediate the first and second ends; the first end being removably attached to an upstream tube; the second end being removably attached to a downstream tube; the tube having a channel defined therein, the channel having a diameter larger than an inner diameter of the upstream tube; the channel being in fluid communication with the upstream and downstream tubes; and the opening having a microwave emitter positioned therein.

BRIEF DESCRIPTION OF THE DRAWINGS

The present description is illustrated by way of example only with reference to the appended drawings wherein.

DETAILED DESCRIPTION

Figure 1:
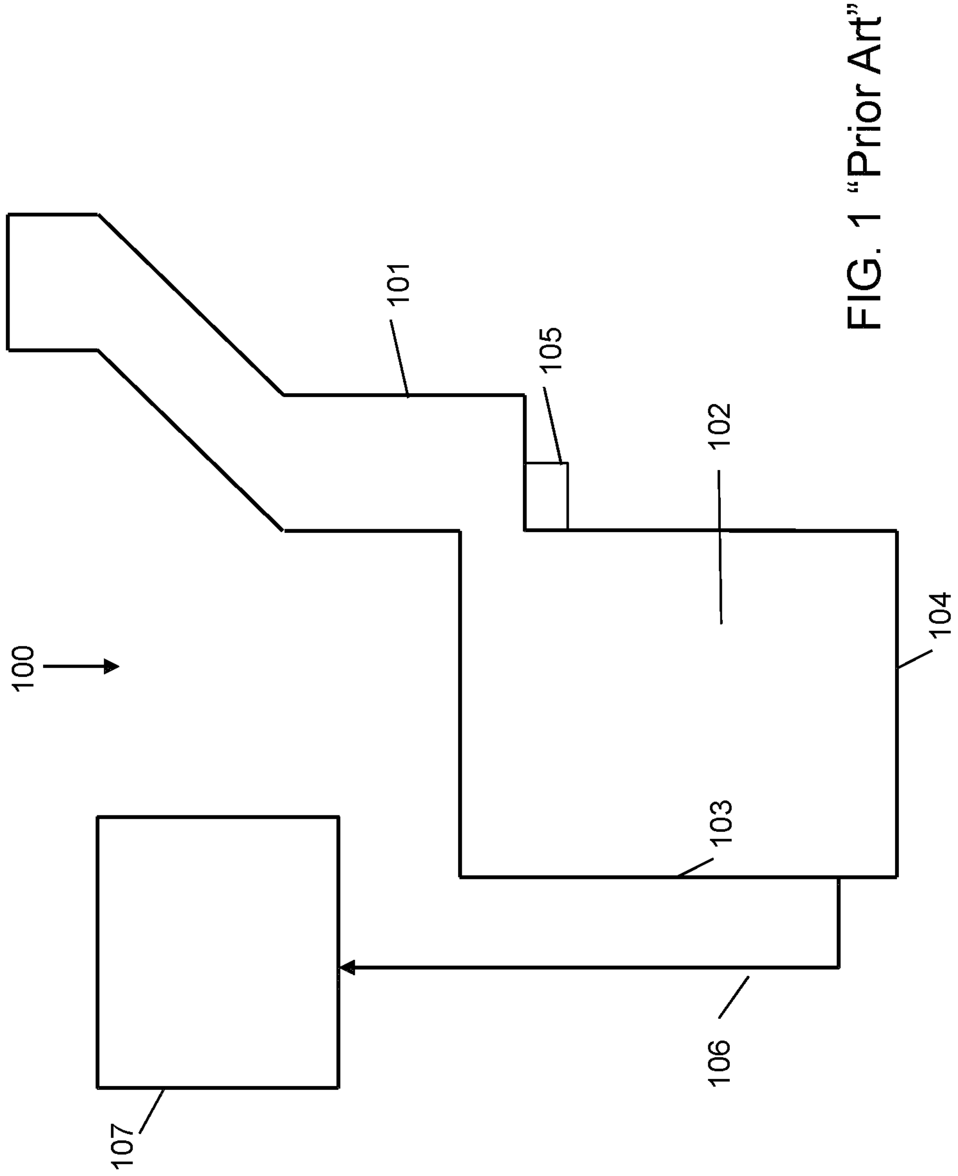
FIG. 1 is a schematic of a steam cracking furnace, as known in the art.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art. Thus, the term "comprising" as used in this specification means "consisting at least in part of". When interpreting statements in this specification that include the term "comprising", the features, prefaced by that term in each statement, all need to be present but other features can also be present. Related terms such as "comprise" and "comprised" are to be interpreted in the same manner.

It will be appreciated that the term microwave emitter used herein refers to any type of microwave emitter.

It will also be appreciated that the term "flanged spool piece" used herein refers to a pipe section or segment. In most cases, and as known in the art, a spool has flanges provided on one or both ends.

The term "and/or" can mean "and" or "or".

One or more of the terms "vertical", "vertically", "horizontal", "horizontally", "top", "bottom", "upwardly", "downwardly", "upper", "lower", "inner" and "outer" are used throughout this specification. It will be understood that these terms are not intended to be limiting. These terms are used for convenience and to aid in describing the features herein, for instance, as illustrated in the accompanying drawings.

Microwave heating can be utilized in chemical reactions or processes including, but not limited to, hydrocarbon cracking, catalytic heterogeneous reactions, disposal of hazardous waste, food processing, drying processes and pyrolysis of various organic wastes. Such organic wastes can include, but are not limited to, biomass, sludge, oil shale and plastic waste. It will be appreciated that the equipment discussed herein can be used in combination with or replace heating methods currently used in one or more of the chemical processes discussed above.

More generally, any chemical process wherein it is desirable to heat a fluid being conveyed through tubing, and wherein at least one of the involved chemical and/or physical transformations can be facilitated using microwave radiation, can benefit from the apparatus discussed herein.

FIG. 1 is an example illustration of a schematic of a typical steam cracking furnace 100. In steam cracking, gaseous or liquid hydrocarbon feed streams such as naptha, liquefied petroleum gas and ethane are broken down (cracked) into desirable products such as ethylene propylene and/or butadiene. A convection section 101 is located above a radiant section 102. The convection section 101 recovers heat energy from the flue gases that exit the radiant section. Such flue gases comprise combustion products of burners, such as methane powered burners, located in the radiant section 102. The heat energy recovered in the convection section can be used to preheat the hydrocarbon feed and boiler feed water as well as to superheat the saturated steam produced in the waste heat recovery system. The radiant and convective sections can comprise horizontal or vertical coil designs (not shown). The vertical design involves a number of vertical tubes "hanging" within the radiant section between walls 103 and above floor 104. During operation of the furnace 100, the hydrocarbon and steam mixture flows from the convective section 101 through the convective section outlet 105 into the radiant section 102, and out of the radiant section 102 through a radiant section outlet 106 into a cooling section 107.

During operation of the steam cracking furnace 100, coke builds up within the tubing coils within the convection section 101 and the radiant section 102. Coke builds up particularly quickly in the coils in the radiant section 102, the hottest section in the furnace, and can hinder heat transfer from the burners to hydrocarbons flowing through the radiant coils. In steam cracking furnaces, the residence time of the hydrocarbons in the radiant coils is often less than half a second. Too long of a residence time can result in excessive coke buildup and poor selectivity.

In an example embodiment, the microwave heating apparatus discussed further below can replace the lower, or radiant portion of one or more steam cracking furnaces in a steam cracking plant. The microwave heating apparatus can also be inserted into an existing firebox (i.e., the walls of the radiant section). It is postulated that implementing the equipment discussed below can reduce operating costs and/or the carbon footprint of steam cracking processes.

Figure 2:
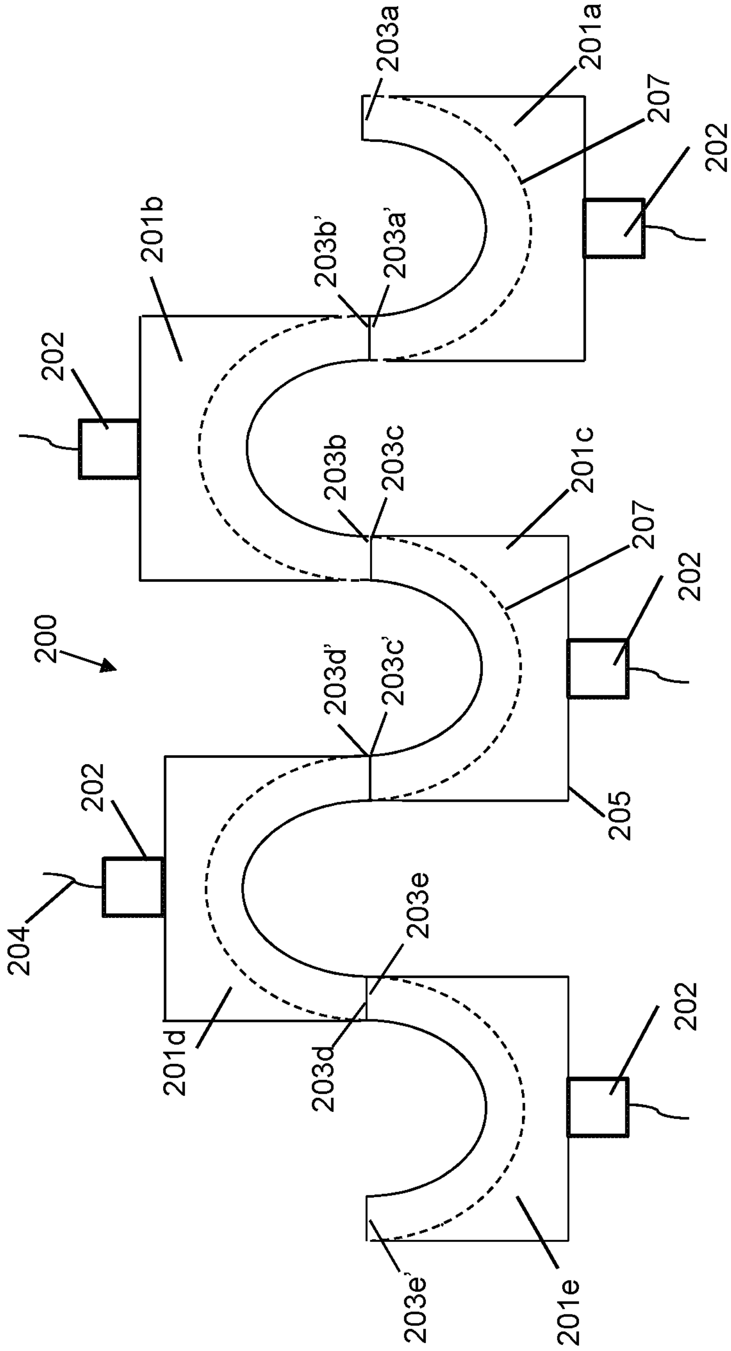
FIG. 2 is a side view of an example embodiment of a tubing conduit.

FIG. 2 illustrates an example embodiment of a tubing conduit 200 comprising removable bend portions 201*a*, 201*b*, 201*c*, 201*d* and 201*e*, which are referred to collectively as bend portions 201. Although five bend portions 201 are depicted in the example illustration, it will be understood that the tubing conduit can include fewer than or more than five bend portions 201. Each of the removable bend portions 201 has a microwave emitter 202 attached thereto. During operation, microwave radiation from emitter 202 can heat the inner surface of the tubing and/or heat the fluid being conveyed through the tubing conduit 200. Seating surfaces 203*a*, 203*a*', 203*b*, 203*b*', 203*c*, 203*c*', 203*d*, 203*d*', 203*e* and 203*e*' are referred to collectively as seating surfaces 203. Each bend portion 201 is substantially U-shaped, and comprises two tube seating surfaces 203, an inner bend surface 207, and an external bracing surface 205. Seating surface 203*a* is connected to another bend portion or a fluid inlet tube or pipe (not shown). Seating surface 203*a*' is connected to seating surface 203*b*', thereby connecting bend portion 201*a* to bend portion 201*b*. Seating surface 203*b* is connected to seating surface 203*c*, thereby connecting bend portion 201*b* to bend portion 201*c*. The remaining bend portions are connected by their respective seating surfaces in similar fashion. The seating surface 203*e*' can be connected to another bend portion or a fluid outlet tube or pipe (not shown). Gaskets can form a seal between seating surfaces 203 of connected bend portions 201, or the seating surfaces 203 can be interference fitted to each other.

Figure 3:
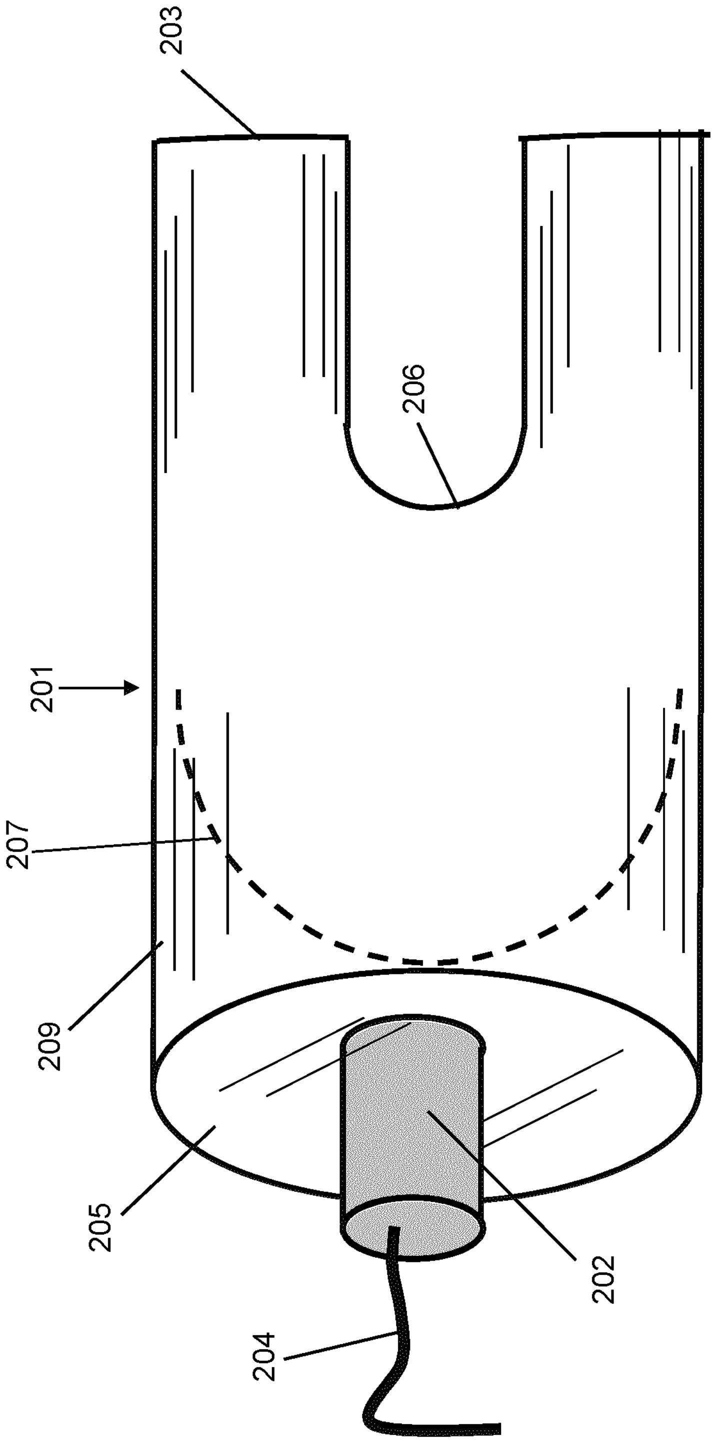
FIG. 3 is a perspective view of a bend portion of the tubing cool shown in FIG. 2.

FIG. 3 illustrates a perspective view of a removable bend portion 201. The microwave emitter 202 is connected to the external surface 205 and extends toward inner bend 207. The microwave emitter 202 can heat the fluid flowing through bend portion 201. The microwave emitter 202 can receive microwave frequency energy through power cord 204. The source of microwave energy can be, for example, a magnetron. The removable bend portion 201 comprises a curved seating surface 206 which corresponds to the shape of a support surface of a support structure as discussed in greater detail with reference to FIGS. 4 and 5.

It will be appreciated that the removable bend portion 201 may optionally comprise one or more microwave absorbing materials including, but not limited to ceramic materials, metal oxides, or carbon-containing materials. The removable bend portion 201, preferably the inner bend 207, may optionally comprise microwave transparent materials including, but not limited to quartz. Microwaves from the emitter 202 can pass through the quartz included in inner bend 207 to heat the fluid flowing through the bend portion 201 and/or to heat the inner surface of the bend portion 201. The bracing surface 205 of the bend can provide support for the inner bend 207. The seating surface 205 and an inner surface 209 of the bend portion 201 may optionally include materials that reflect microwaves to contain same within the bend portion 201.

It will be appreciated that other parts of the bend portion 201, such as seating surface 206, may optionally comprise microwave absorbing materials such as those discussed further herein.

Figure 4:
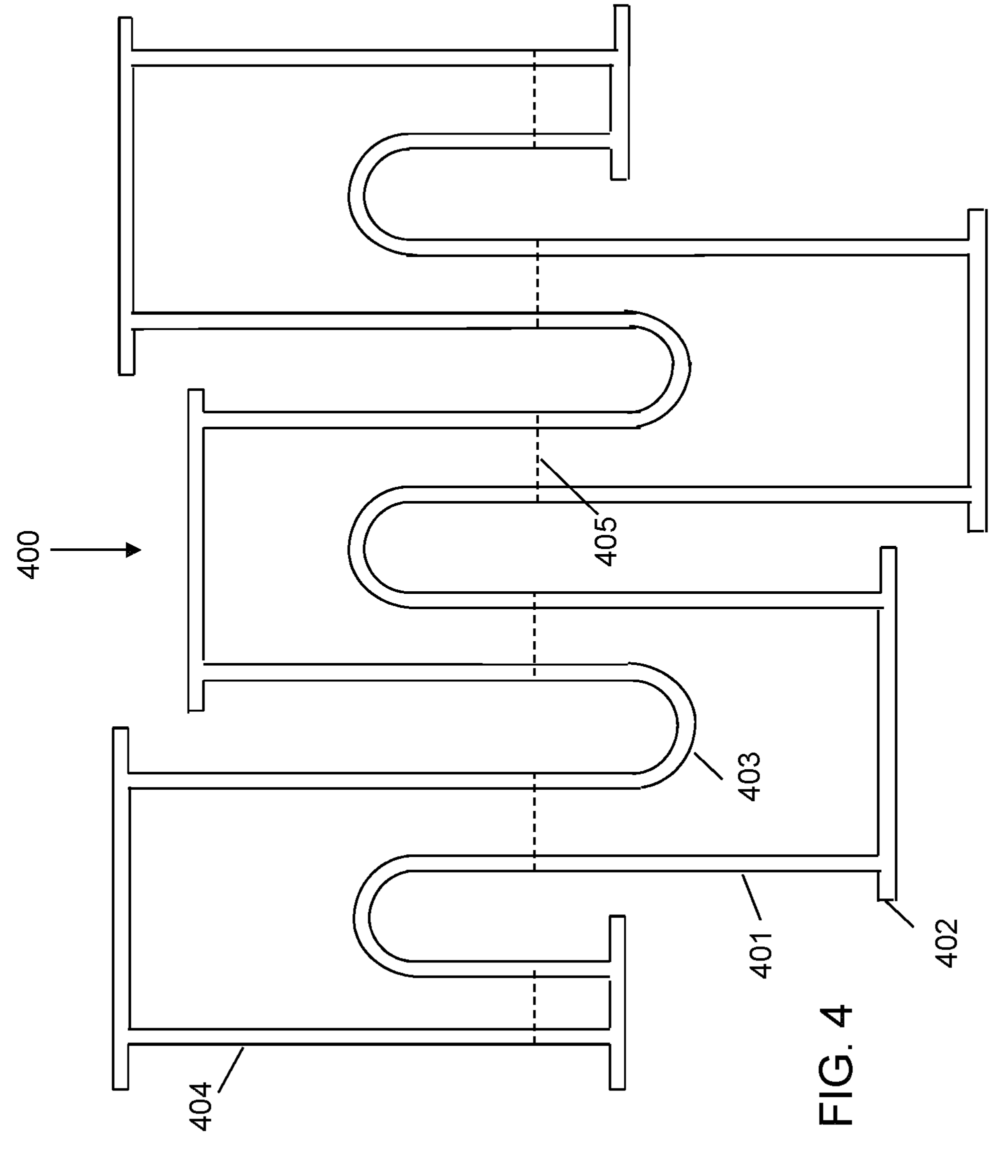
FIG. 4 is a cross-sectional view of a support system for the tubing conduit of FIG. 2.

FIG. 4 illustrates a cross-sectional view of a support system 400 for the tubing conduit 200. The support system consists of a number of connected tubing support portions 401. Each tubing support portion 401 comprises an outer support flange 402 and a support surface 403. The tubing support system 400 can be manufactured, for example, by manufacturing support portions 401 separately and subsequently connecting them together by means such as welding along as shown by dashed lines 405 for ease of reference.

Figure 5:
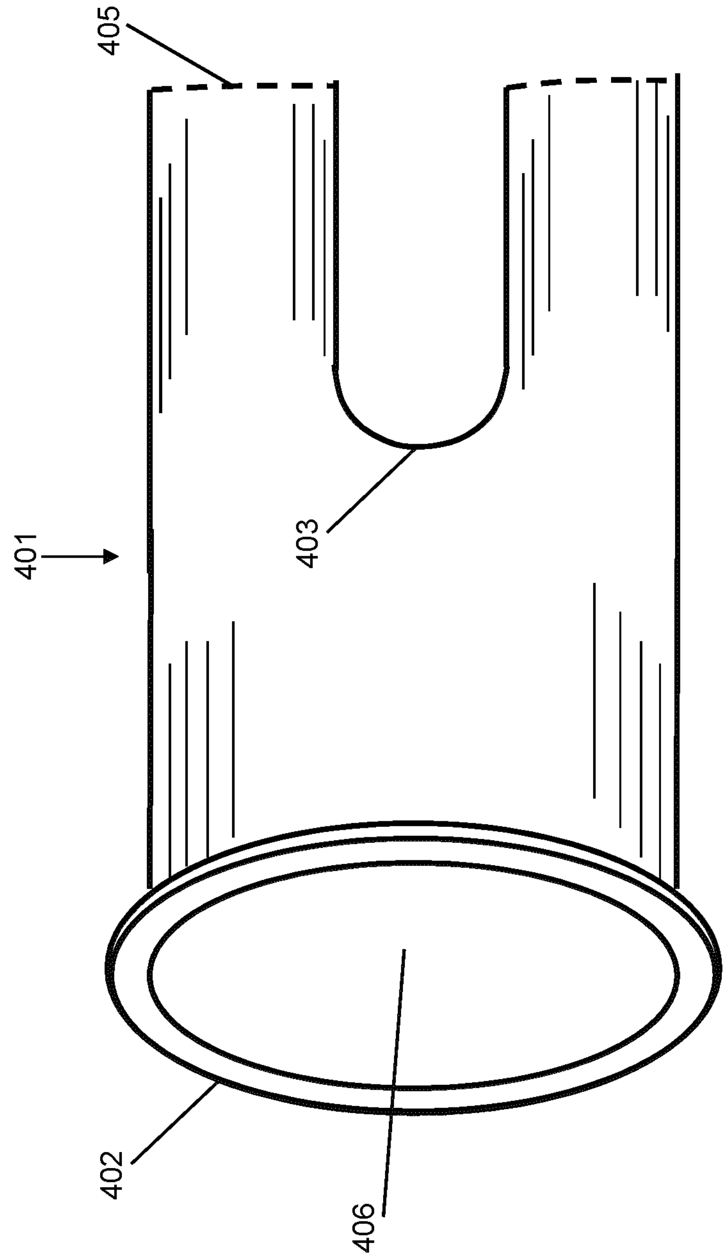
FIG. 5 is a perspective view of a tubing support portion 401 of the support system of FIG. 4.

FIG. 5 illustrates a perspective view of the tubing support portion 401. The tubing support portion 401 comprises an opening 406 adapted to slidably receive bend portion 201 such that the curved seating surface 206 sits against or near support surface 403 and the seating surfaces 203 connect to each other in the manner discussed above to connect their respective bend portions 201. The connection of these elements is illustrated in detail in FIG. 6.

As discussed in greater detail below, the support system 400 can be cooled by being exposed to the external environment or by actively circulating a cooling fluid, such as air, over the support system 400. The air may be circulated by means such as fans. The support system 400 can also include an external cooling jacket through which a fluid such as water can flow and absorb heat from the system. Cooling the support system 400 can help to reduce the thermal cycling of the support portions 401 and/or the removable bend portions 201 resulting from repeatedly transitioning between high and low temperature conditions.

Figure 6:
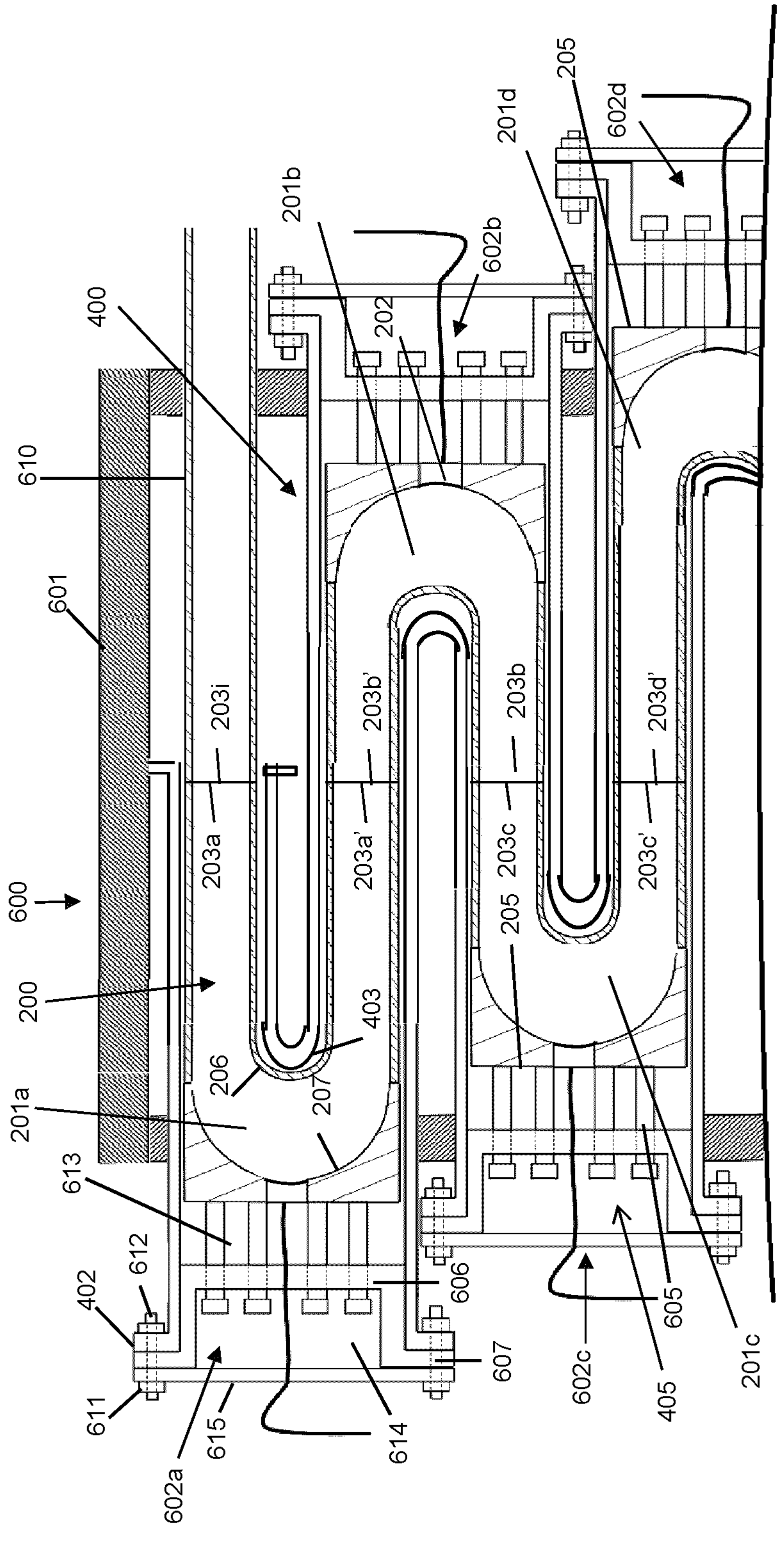
FIG. 6 is a cross-sectional view of a portion of a microwave heating apparatus assembled within an insulated enclosure.

FIG. 6 illustrates a cross-sectional view of an example embodiment of a portion of a microwave heating apparatus 600 comprising support system 400 and tubing conduit 200 assembled together within an insulated enclosure 601. An inlet tube 610 is depicted entering the insulated enclosure 601. The seating surface 203*a* is retained against a seating surface 203*i* of the inlet tube 610 by a push mechanism 602*a*, thereby connecting the inlet tube to bend portion 201*a*. The seating surfaces 203*a*' and 203*b*' are retained against each other by push mechanism 602*a* and a push mechanism 602*b*, respectively, thereby connecting bend portions 201*a* and 201*b*. Bend portions 201*c* and 201*d* are retained against each other by push mechanisms 602*c* and 602*d*, respectively, in the same manner discussed above. Push mechanisms 602*a*, 602*b*, 602*c* and 602*d* are collectively referred to as push mechanisms 602. Each push mechanism 602 is connected to outer support flange 402 and extends through opening 406. The push mechanisms 602 exert a pushing force against the external bracing surfaces 205 of the removable bend portions 201 to retain opposed seating surfaces 203 against each other, thereby connecting the removable bend portions 201 together to form the conduit 200 (FIG. 2) within the support system 400. In an example embodiment, a gasket or some other sealing material that is resistant to high temperatures, such as mica or Thermiculite®, may be positioned between opposing seating surfaces 203. In another example embodiment, an interference fit is used to connect opposing seating surfaces 203.

It can be appreciated that a radiant heating means, such as methane powered furnace guns, can optionally be disposed within the insulated section 601 to provide heat to supplement the heating resulting from microwave irradiation as described herein.

Each push mechanism 602 comprises a jacking bracket 606, which comprises a flange 607 that is fastened to the support flange 402, such as by bolts 611 and nuts 612. Jack screws 605 extend from the jacking bracket 606 to the external bracing surface 205 and can be turned to push the curved seating surface 206 toward the support surface 403, thereby retaining seating surfaces 203 against one another.

The heating apparatus 600 comprises a blind flange 615 that is connected to flange 607 via bolts 611 and nuts 612. Although bolts and nuts are shown, it will be appreciated that other clamping mechanisms or mechanical fasteners could be used.

The example push mechanisms 602 in FIG. 6 are shown as comprising jack screws 605. However, other means can be used to exert a pushing force against the external bracing surface 205. It will be appreciated that the push mechanisms can include other means of applying a force, such as hinged clamps, hydraulic pistons, pneumatic pistons, devices with threaded screws, or combinations thereof.

A first space 614 is defined between the jacking bracket and the blind flange. A second space 613 is defined between the jacking bracket and the bend portion 201. The spaces 613 and 614 can be pressurized, in the presence or absence of insulation, to assist in retaining the bend portions 201 together. The insulation can include commonly used furnace lining insulation. Examples of materials commonly used in furnace insulation include but are not limited to polycrystalline wool, refractory ceramic fiber, and low bio-persistent fiber. The spaces 613 and 614 can include inert gas at a higher pressure than the fluid flowing through the conduit 200 to prevent fluid from escaping from conduit 200. If inert gases leak into the conduit 200 and mix with the fluid flowing therethrough, they are unlikely to participate in whatever reactions might be taking place.

Figure 7:
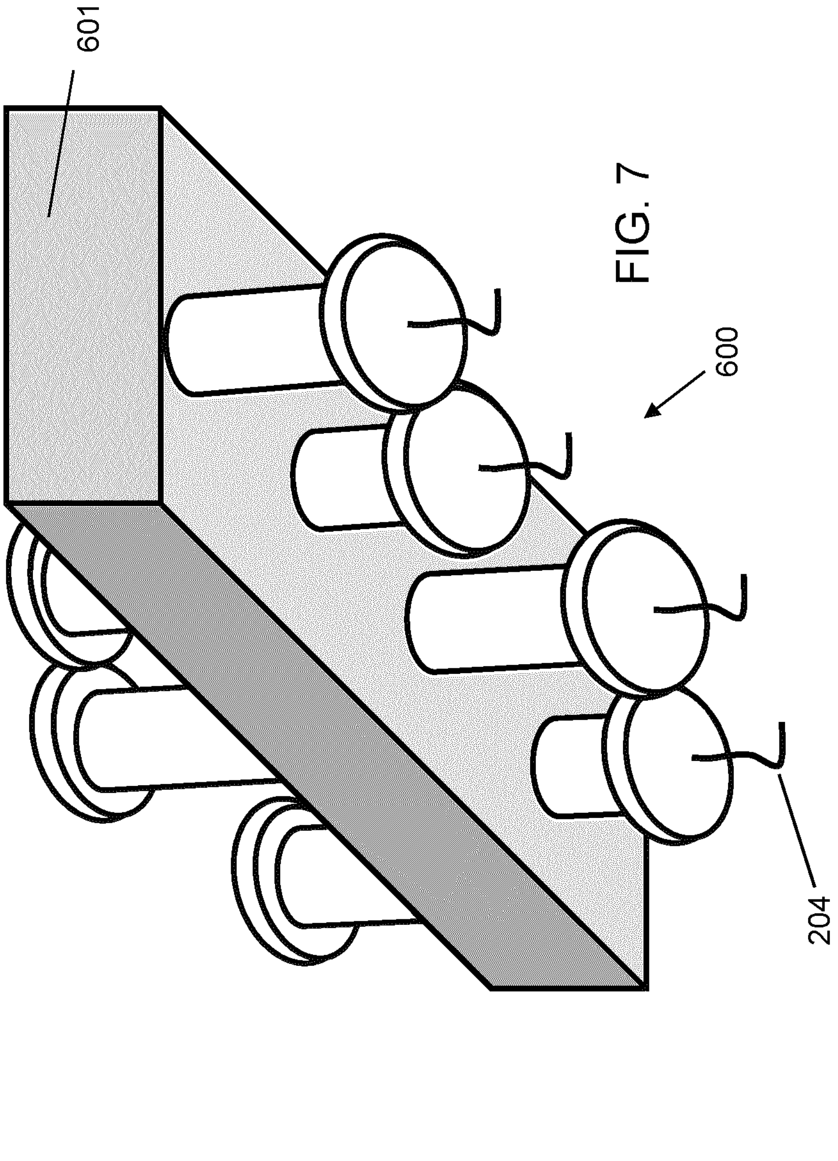
FIG. 7 is a perspective view of the microwave heating apparatus of FIG. 6.

Turning to FIG. 7, a perspective view of the heating apparatus 600 being assembled inside the insulated enclosure 601 is shown. The insulated enclosure could be the radiant section 102 of a cracking furnace 100, as discussed with respect to FIG. 1. As noted above the insulated enclosure 601 can optionally include heating means such as burners to supplement the microwave heating. The insulated enclosure 601 can also optionally be a cooling structure, such as a cooling jacket through which a cooling fluid flows, or an enclosure comprising a fan system to cool the support system 400 as discussed above.

Figure 8:
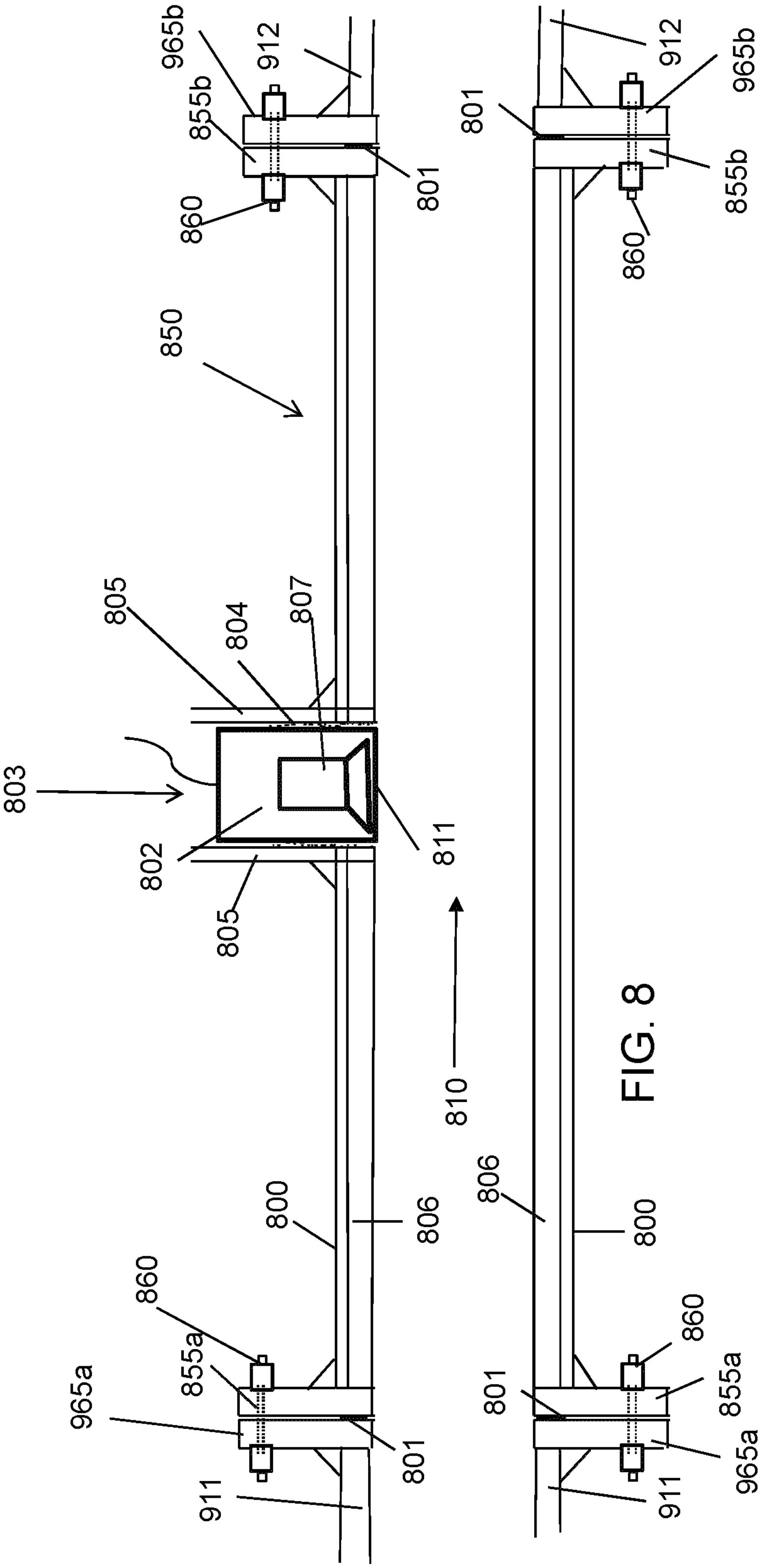
FIG. 8 is a cross-sectional view of a flanged spool piece comprising a threadedly connected insert having a microwave emitter embedded therein.

Turning to FIG. 8, illustrated is a flanged spool piece 850 which can connect flanged metal tubes 911 and 912 to convey a fluid therebetween via a channel 810 within the flanged spool piece 850. Flanged spool piece 850 comprises a tube 800 having a cylindrical extension 805 extending radially from the tube 800 and having an opening 803. The tube 800 further comprises flanges 855*a* and 855*b*, referred to collectively as flanges 855. Flanges 855 can be connected to the tube 800 by way of, for example, welding. Opening 803 can be adapted to threadedly receive a threaded insert 802. The tube 800 further comprises a liner 806 comprising one or more microwave absorbing materials, such as SiC, carbon materials, metal oxides and/or ceramics. Such microwave absorbing materials can be heated by microwave radiation not absorbed by the fluid flowing through the channel, thereby further heating the fluid. A microwave emitter 807 is connected to threaded insert 802. In the example illustration shown in FIG. 8, the microwave emitter 807 is positioned to emit radiation such that it passes through a sealing surface 811 of the insert 802. The sealing surface 811 can optionally include materials that are transparent to microwave radiation such as quartz, as discussed above. The tube 800 can be made from a material such as steel. The tubes 911 and 912 comprise flanges 965*a* and 965*b*, respectively. Flanges 965*a* and 965*b* are referred to collectively as flanges 965. Flanges 965*a* and 965*b* can be connected to flanges 855*a* and 855*b*, respectively, using bolts/screws 960. Flanges 965 can be connected to respective tubes 911 and 912 by way of, for example, welding. Gaskets 801 can be placed between flanges 965 and 855 to assist in sealing channel 810.

Figure 9:
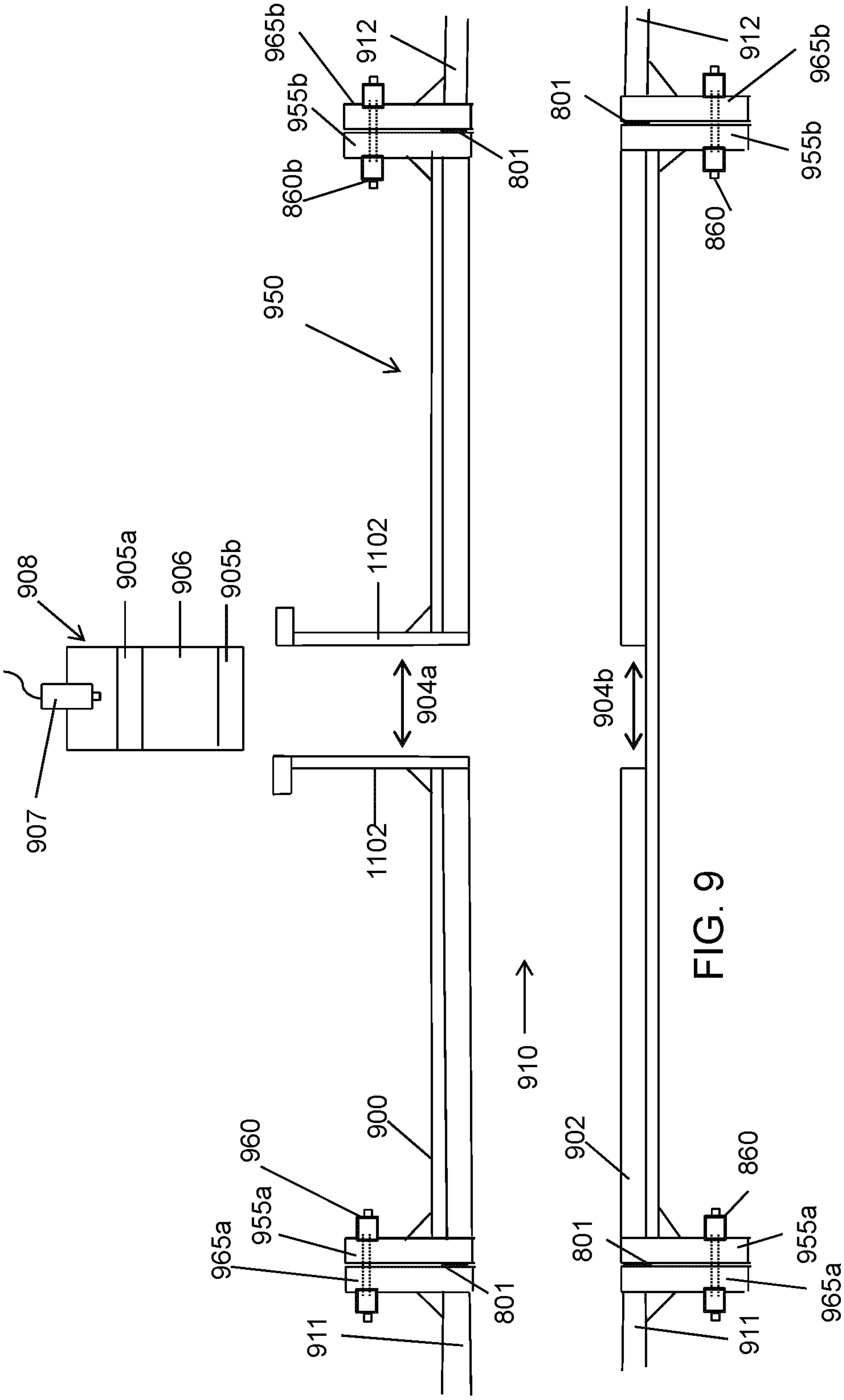
FIG. 9 is a cross-sectional view of a flanged spool piece including a removable insert having a microwave emitter embedded therein.

FIG. 9 illustrates an example embodiment of another flanged spool piece 950. Flanged spool piece 950 comprises a channel 910 adapted to convey a fluid therethrough. Flanged spool piece 950 can be connected to tubes 911 and 912 to convey a fluid therebetween via the channel 910. Flanged spool piece 950 comprises a tube 900 having flanges 955*a*, 955*b* and insert flange 1102 connected thereto. Flanges 955*a* and 955*b* are referred to collectively as flanges 955. Flanges 955*a* and 955*b* can be connected to flanges 965*a* and 965*b*, respectively, by means such as bolts/screws 960. The tube 900 can be made from a material such as steel. Flanges 955 and insert flange 1102 can be connected to the tube 900 by way of, for example, welding. Insert flange 1102 has an opening 904*a* therein, the opening 904*a* being in fluid communication with channel 910 and being adapted to receive an insert 908. The tube 900 further comprises a liner 902 comprising one or more microwave absorbing materials, such as those discussed above. Insert 908 comprises removable liner 905. Removable liner 905 consists of an upper liner 905*a* and a lower liner 905*b*. Removable liner 905 has a channel 906 extending therethrough. A slot 904*b* in the liner 902 is adapted to receive and retain removable liner 905. The removable liner 905 is adapted to fit into slot 904*b* such that channel 906 is in sealed communication with channel 910. Lower liner 905*b* can optionally comprise one or more microwave absorbing materials. Upper liner 905*a* can optionally comprise materials that are transparent to microwave radiation such as quartz, such that radiation from a microwave emitter 907 can pass through upper liner 905*a* to heat lower liner 905*b*, liner 902, and/or the fluid flowing through the channels 906 and 910. Gaskets, such as those discussed above, can be placed between removable liner 905 and liner 902 to prevent fluid from escaping or entering channels 910 and 906.

In another example embodiment of the flanged spool piece, the openings can be adapted to receive a conical insert. Thus, the lower slot would be narrower than upper opening to receive such insert.

It will be understood that although the tubes 800, 900 and 1002 (discussed below) are depicted as being straight, the principles discussed above can be applied to tubes having other shapes such as U-bends, V-bends, 90-degree bends etc.

It can be appreciated that the internal diameter of the liners 806 and 902 can be larger than, equal to, or lesser than the inner diameter of the open ends 911 and 912. A purpose of having an internal diameter larger than that of the open ends is discussed with respect to FIG. 12.

The removable liner 905 can be mechanically retained within slot 904*b* in the manner discussed below with respect to FIG. 11. It will be appreciated that the removable liner 905 can optionally be machine fitted into slot 904*b* within liner 902.

In another example embodiment, more than one flanged spool piece 850, 950 and/or 1002 (FIG. 12) can be connected in series between tubes 911 and 912. In such embodiment, flanges 855*a* or 955*a* of a first flanged spool piece 850 or 950, respectively, can be connected to flanges 855*b* or 955*b* of a second flanged spool piece 850 or 950, respectively.

Figure 10:
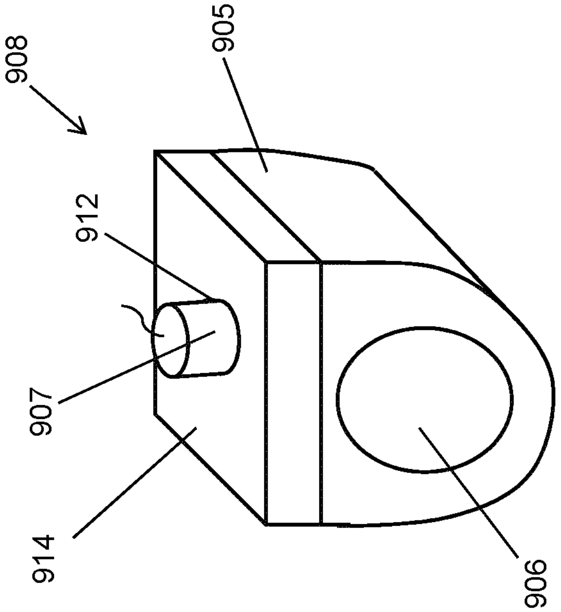
FIG. 10 is a view of the insert shown in FIG. 9.

FIG. 10 illustrates a perspective view of the pipe insert 908. A bore 912 extends through an external bracing layer 914 of the insert 908. The bore 912 is adapted to contain the microwave emitter 907. The microwave emitter 907 may optionally be threadedly connected to bracing layer 914 via threading in bore 912.

Figure 11:
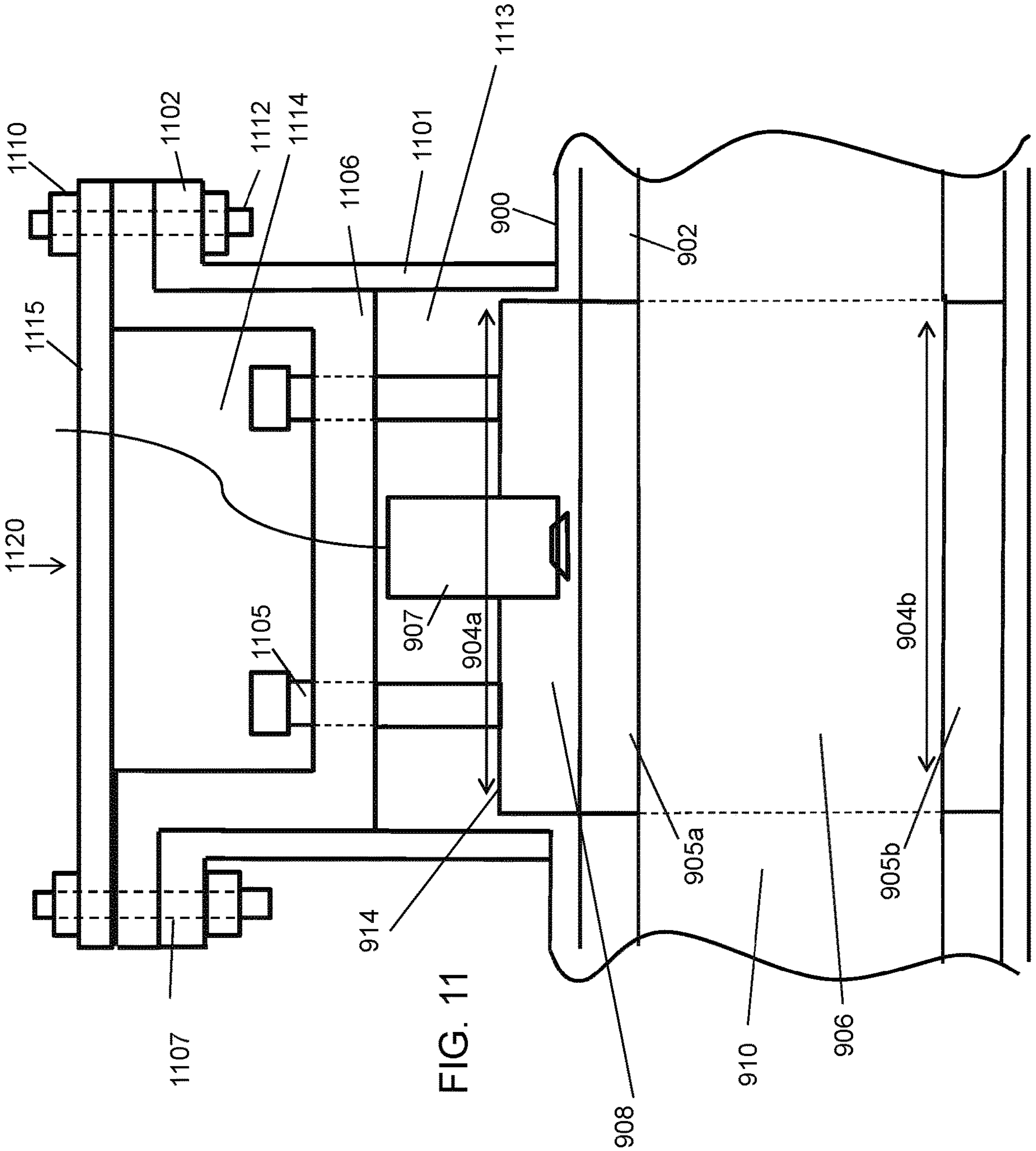
FIG. 11 is a cross-sectional view of the insert shown in FIG. 9 being mechanically retained.

FIG. 11 illustrates the pipe insert 908 of flanged spool piece 950 being mechanically retained in slot 904*b*. A push mechanism 1120 exerts a pushing force against the external bracing layer 914 of the pipe insert 908 to retain the pipe insert 908 within the slot 904*b*. The example push mechanism in FIG. 11 is shown as comprising jack screws 1105. However, other types of push mechanisms can be used to exert a pushing force against the bracing layer 914. Other push mechanisms can include hinged clamps, hydraulic pistons, pneumatic pistons, devices with threaded screws, or combinations thereof.

An outer support jacket 1101 is mounted to the tube 900 by means such as welding and extends radially outward from tube 900. The outer support jacket 1101 includes a support flange 1102. A flange 1107 extending from a jacking bracket 1106 is fastened to a support flange 1102, such as by bolts 1110 and nuts 1112. The jack screws 1105 exert a force on bracing layer 914 to retain the removable liner in slot 904*b*, thereby aligning channels 906 and 910. A blind flange 1115 is fastened to jacking bracket 1106 by bolts 1110 and nuts 1112. Although bolts and nuts are shown, it will be appreciated that other clamping mechanisms or mechanical fasteners can be used.

A first space 1114 is defined between the jacking bracket 1106 and the blind flange 1115. A second space 1113 is defined between the jacking bracket 1106 and the pipe insert 908. The spaces 1113 and 1114 can be pressurized, in the presence or absence of insulation, to assist in retaining the pipe insert 908 and/or to prevent fluid flowing through channels 910 and 906 from escaping if the seal is comprised. As noted above, the insulation can also include commonly used furnace lining insulation if the fluid in the tubing is at high temperatures. Examples of materials commonly used in furnace insulation include but are not limited to polycrystalline wool, refractory ceramic fiber, and low bio-persistent fiber.

Figure 12:
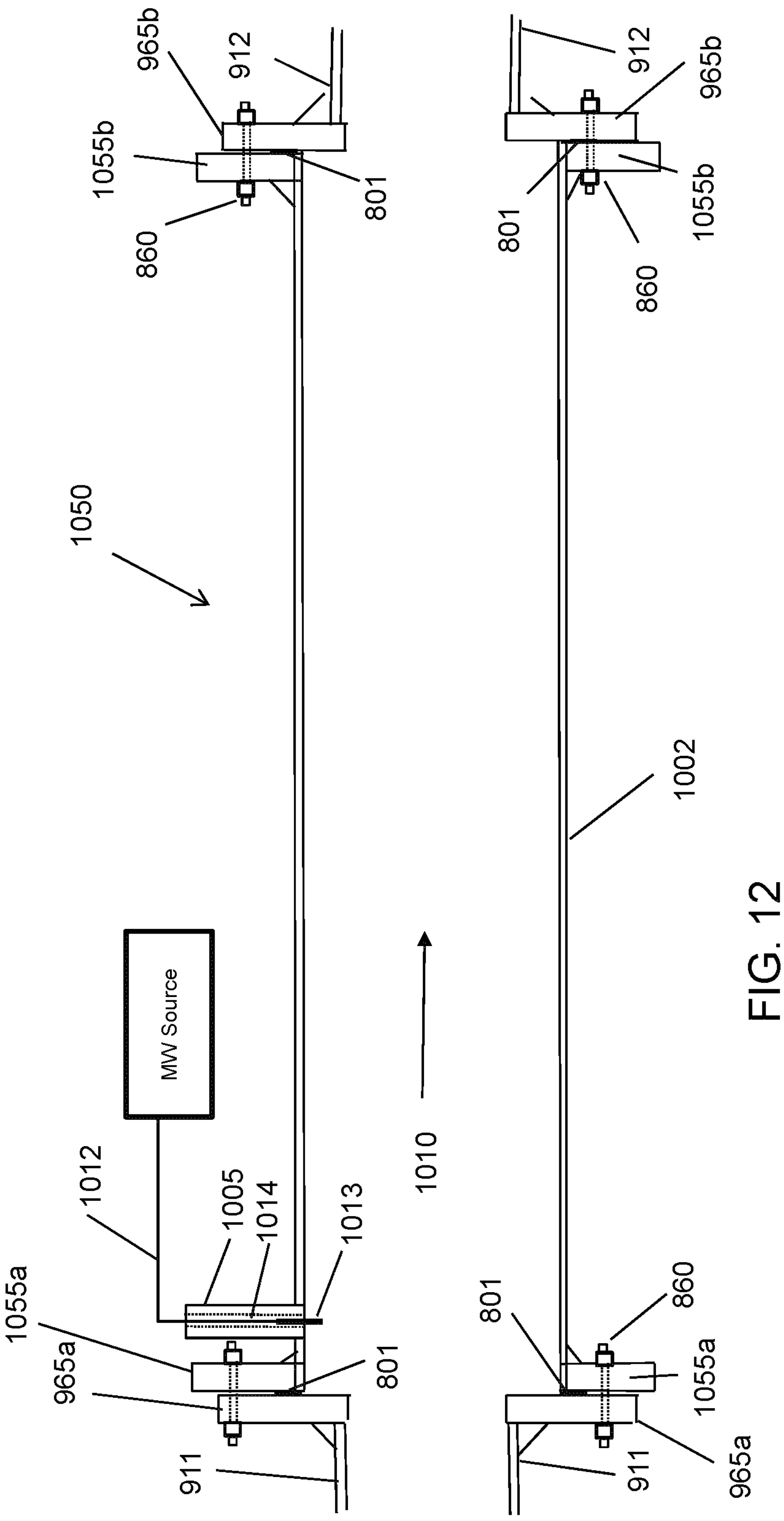
FIG. 12 is a cross-sectional view of a flanged spool piece comprising a microwave emitter, the flanged spool piece being adapted to promote turbulent flow of a process fluid.

Turning to FIG. 12, illustrated is another embodiment of a flanged spool piece 1050. As shown, the flanged spool piece 1050 includes a single tube 1002 having a channel 1010 defined therein having an inner diameter that is greater than an inner diameter of the tube 911, and optionally greater than an inner diameter of the tube 912. It is believed that flowing fluid from the tube 911 of lesser inner diameter into the channel 1010 of greater inner diameter can promote turbulent flow. As will be understood, turbulent flow can aid in mixing the fluid such that a greater portion thereof can be exposed to microwaves transmitted from a microwave emitter 1013. The microwaves transmitted from the emitter 1013 can be provided by a power cable 1012 extending between the emitter 1013 and a microwave energy source, such as a magnetron. The microwave emitter 1013 is illustrated as being a cable (e.g., a monopole antenna), however, the emitter 1013 can be similar to that shown in FIG. 11, which is depicted as a horn-type antenna. It will be understood that a person skilled in the art could substitute the emitter 1013 with another known type of emitter. The microwave emitter 1013 can extend into the channel through an opening 1014 in a cylindrical extension 1005. As will be understood, known sealing means such as gland packing, or a mechanical seal can be used to create a seal between the opening 1014 and the channel 1010. The tube 1002 can be made from a metal that is reflective to microwaves, such as stainless steel, aluminum or other metals commonly used in microwave applications.

In the present description, reference is made to a "spool" or a "spool piece". As noted above, such terms typically refer to a pipe segment having flanges on opposing ends and which are generally used to connect to adjacent pipe segments on each end. While, as noted above, the presently described microwave devices are particularly suited for utilization on spools, it will be understood that such devices may be used on any pipe segment, whether or not a spool. Thus, it will be understood that the reference to "spool" in the present description is intended to include any pipe segment where the present heating devices may be incorporated.

It will also be appreciated that different features of the example embodiments of the system, the method and the apparatus, as described herein, may be combined with each other in different ways. In other words, different modules, operations and components may be used together according to other example embodiments, although not specifically stated.

Although the above has been described with reference to certain specific embodiments, various modifications thereof will be apparent to those skilled in the art without departing from the scope of the claims appended hereto.

The invention claimed is:

1. An apparatus for heating a fluid, the apparatus including a tubular conduit for conveying the fluid, the tubular conduit comprising:

first and second bend portions, each bend portion having first and second ends; the first end of the first bend portion being removably attached to an upstream tubular component;

the second end of the first bend portion being removably attached to the first end of the second bend portion such that the first and second bend portions are in fluid communication;

the second end of the second bend portion being removably attached to a downstream tubular component; and each bend portion being provided with at least one microwave emitter adapted to apply microwave energy to the tubular conduit for heating the fluid the microwave emitter being attached to an external bracing surface of the respective bend portion and extending toward an inner bend surface of the respective bend portion;

wherein the apparatus further includes a support structure containing the first and second bend portions.

2. The apparatus of claim 1, wherein the support structure includes first and second support portions, the first and second support portions each having a distal end and a proximal end; each distal end having an opening through which a bend portion is slidably insertable in a direction toward the proximal end; and each proximal end containing the first and second ends of the respective bend portion.

3. The apparatus of claim 2, wherein the proximal end includes first and second tubular passages; the first end of a respective bend portion being provided coaxially within the first tubular passage; and the second end of the respective bend portion being provided coaxially within the second tubular passage.

4. The apparatus of claim 2, wherein each distal end comprises a jacking bracket and one or more jack screws configured to exert a pushing force against the respective bend portion in the direction of the proximal end, thereby retaining the bend portions against one another.

5. The apparatus of claim 4, wherein the push mechanism comprises a first flange attached to the distal end; and a jacking bracket comprising a second flange, the second flange being removably attached to the first flange by bolts and nuts, the jacking bracket carrying one or more jack screws extending toward the respective bend portion by bolts and nuts, the jacking bracket carrying one or more jack screws extending toward the respective bend portion.

6. The apparatus of claim 1, wherein at least a portion of the support structure is contained within an insulated enclosure.

7. The apparatus of claim 6, wherein the insulated enclosure comprises at least one heat source for heating the portion of the support system.

8. The apparatus of claim 7, wherein the at least one heat source is a methane burner.

9. The apparatus of claim 1, wherein at least one of the upstream tubular component and the downstream tubular component comprises further bend portions that are removably attached and each provided with at least one microwave emitter.

10. The apparatus of claim 1, wherein at least one of the bend portions includes a surface comprising a microwave energy absorbing material.

11. The apparatus of claim 1, wherein at least one of the bend portions includes a surface comprising a microwave reflecting material.

* * * * *